July 17, 1923.
Re. 15,656
J. A. ROCHE
LANDING GEAR FOR AIRPLANES
Original Filed Feb. 25, 1919
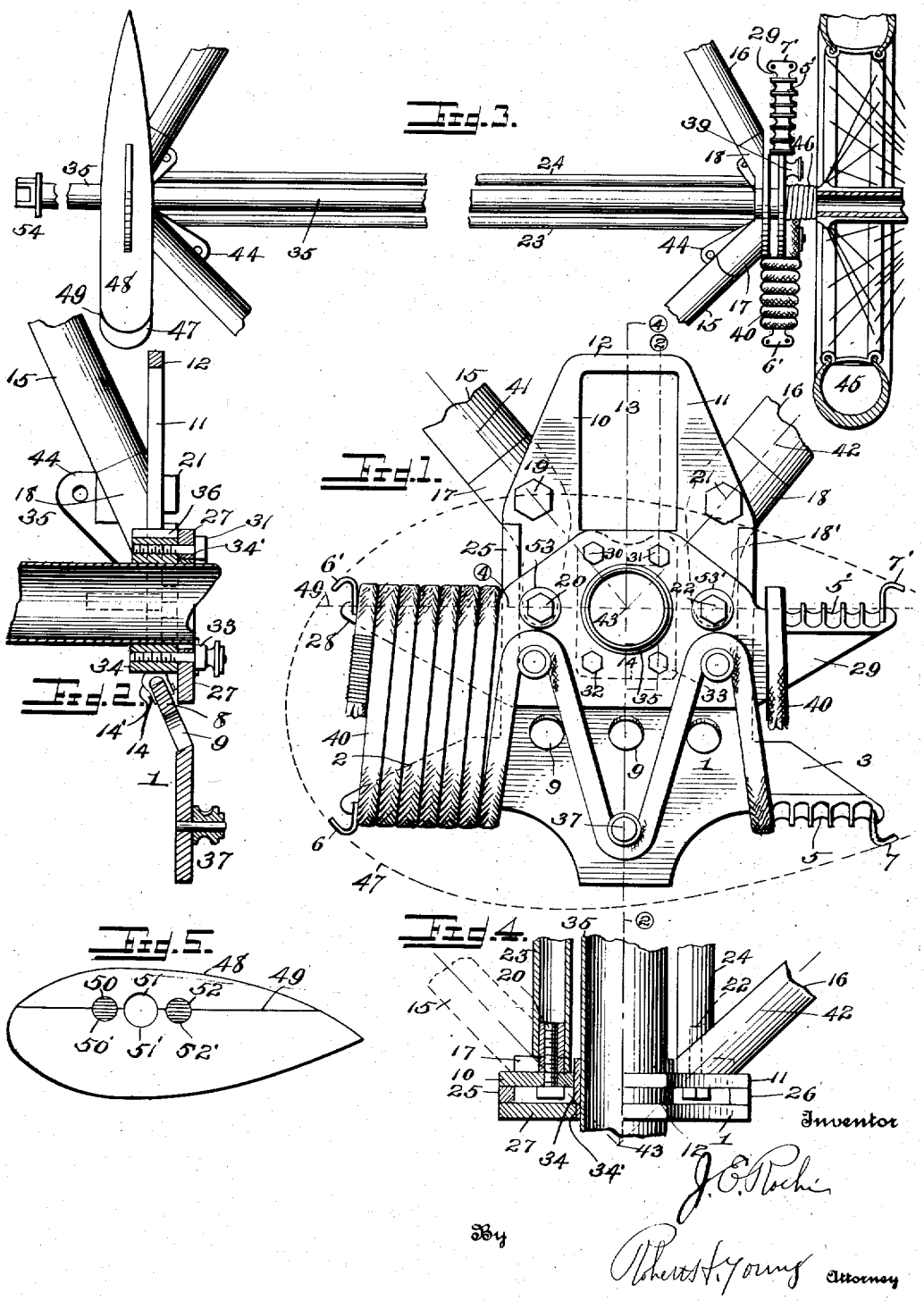
Inventor
J. A. Roche
By
Robert T. Young
Attorney Reissued July 17, 1923. Re. 15,656

UNITED STATES PATENT OFFICE.

JEAN A. ROCHÉ, OF DAYTON, OHIO.

LANDING GEAR FOR AIRPLANES.

Original No. 1,329,477, dated February 3, 1920, Serial No. 279,050, filed February 25, 1919. Application for reissue filed April 15, 1921. Serial No. 461,600½.

*To all whom it may concern:*

Be it known that I, JEAN A. ROCHÉ, a citizen of the United States, residing at Dayton, in the county of Montgomery and State of Ohio, have invented certain new and useful Improvements in Landing Gears for Airplanes, of which the following is a specification.

This invention relates to a shock absorbing landing gear for an airplane.

It is an important object of this invention to provide a landing gear so designed that shocks are transmitted directly along the axes of the landing gear struts, said shocks traveling from the landing gear frame to the struts in as nearly as possible straight lines, without traveling through bent lever arms, which would tend to create unbalanced moments of forces that would cause an undue strain on the gear.

It is further an important object of this invention to provide a landing gear which is susceptible of carrying a stream lined casing, which casing itself is of small cross sectional area. This improvement is a manifestation of the present tendency of airplane design, this tendency being to cut down head resistance to the lowest possible terms and to stream line every part that is susceptible of being stream lined.

It is a further object of this invention to provide a landing gear which may be readily detached from the struts on which it is ordinarily mounted, which makes for easy assembly and disassembly.

It is a further object of this invention to provide a landing gear in which the wheels, axle and struts are readily disassembled from the airplane proper, and from each other, which feature facilitates the replacement of parts in case of breakage, as well as the convenience in taking down the airplane for shipment by freight.

It is a further object of this invention to provide a landing gear comprising a fore section of shock absorbing cord and a rear section of shock absorbing cord, the design however permitting a single one-piece stretch of cord to be used for both said fore and aft sections. The tension of said cord is equalized by means of rollers so that there will be no tendency for a section of the rubber cord winding to cause strain on the axle guide mechanism.

Other objects and advantages will appear as the description proceeds.

In the drawings, in which one embodiment of my invention is illustrated, Figure 1, is a side elevation, with the axle shown in section; Figure 2 is a section on the broken line 2—2 of Figure 1; Figure 3 is a plan view of the landing gear on a smaller scale, parts being shown in section; and Figure 4 is a section on the line 4—4, of Figure 1, looking in the direction of the arrows. Figure 5 is a view on a smaller scale, of the stream line casing shown in Figure 3.

Referring now to the drawings, in which similar reference characters are applied to similar parts, the landing gear comprises a main frame 1, which is provided with a web-like forwardly extending shoulder 2, and a similar corresponding rearwardly extending shoulder 3. On their outer and lower edges these shoulders 2 and 3 are provided with relatively broad transverse corrugations 5. At their extreme ends shoulders 2 and 3 may be provided with bent lugs 6 and 7, as shown, for a purpose hereinafter described.

Main frame 1 further comprises an offset portion 8 which may be provided with lightening holes 9. Extending upwardly from the portion 8, are two vertical standards 10 and 11, which are connected together at the top by the integral portion 12, to define the vertically disposed guide slot 13. The lower edge of the slot 13, is indicated at 14.

The strut mounting will now be described. Two struts are ordinarily mounted on the main frame. These struts, indicated at 15 and 16, are mounted in strut sockets 17 and 18. The strut socket 17 is flattened toward its lower end 17′, and is bolted to the standard 10, of the main frame 1, by bolts 19 and 20, passing through this flattened portion 17′. Strut socket 18 is similarly mounted on the standard 11, by bolts 21 and 22, this strut 18 being provided with the flattened portion 18′ through which the bolts 21 and 22 pass.

The two main frames 1, which together are used in a complete landing gear, are rigidly spaced apart by spacer rods or tubes 23 and 24. The same bolts 20 and 22, which as have been described, are used to assist in mounting the strut sockets 17 and 18, extend through the flattened portion of said strut sockets, and engage with appropriately threaded ends of the spacer rods 23 and 24. This is illustrated in Figure 4.

The standards 10 and 11, carry, near their fore and aft edges respectively, vertically disposed spacer lugs 25 and 26, which are somewhat thicker than the heads of the bolts 20 and 22. See Figure 4.

The parts so far described constitute the fixed part of the landing gear. The movable parts will now be described.

The slidable or auxiliary frame of the landing gear is indicated at 27. This auxiliary frame 27 is provided with shoulders 28 and 29, extending respectively fore and aft, said shoulders being co-extensive with and vertically arranged above the already described fixed shoulders 2 and 3 respectively. The upper and outer edges of the shoulders 28 and 29, are provided with transverse corrugations 5′, analogous to the already described corrugations 5. Shoulders 28 and 29, are also provided with integral lugs 6′ and 7′, analogous to the already described lugs 6 and 7. The slidable frame is also provided with holes 53 and 53′ to lighten it and provide easy access to bolts 20 and 22 with a socket wrench.

Bolted to the auxiliary or slidable frame 27, by four bolts 30, 31, 32 and 33, is a bearing block 34, which is made preferably of bronze. This bearing block 34, is mounted to slide in the slot 13. The block 34, is bored out centrally as shown more particularly in Figure 2, to mount the wheel axle 35 therein.

The block 34 is provided with the annular shoulder 34′, which shoulder surrounds the axle 35, and extends into a hole of appropriate size drilled in the slidable frame 27. This shoulder 34′, aids in centering the block 34 in the slidable frame 27. The block 34 is slightly concaved as at 36 to save weight.

Referring now to Figure 4, it will be seen that the slidable frame 27, bears against the already described lugs 25 and 26, to space said slidable frame from the standards 10 and 11, of the fixed frame 1.

The block 34, may rest on a leather pad 14′ fastened along the bottom edge 14 of the slot 13.

Mounted on the fixed frame 1, is a roller 37, and mounted on the slidable frame 27, are two rollers 38 and 39. The slidable frame 27 is normally held in its lowermost position by the heavy resilient cable 40, which passes back and forth from the lower fixed shoulder 2, to the upper shoulder 28. After the cable 40 is wound about the shoulders 2 and 28, it is passed over the roller 38 on the slidable frame, then passes under the roller 37 on the fixed frame, then over the roller 39, on the slidable frame and then back and forth between the aft shoulders 3 and 29. After filling the shoulders 3 and 29, the end is secured in any suitable way, not shown. The corrugations 5 and 5′ are obviously for seating the cable 40. At this point it is desired to emphasize the fact that a single stretch of cable is used to fill both the fore and aft shoulders 2, 28, 3 and 29. In addition to giving the extra resiliency furnished by that part of the cable extending between the rollers 38, 37 and 39, the use of a one-piece cable makes for speed and assembling and disassembling.

The axis of the strut 15 is indicated by the line 41 and the axis of the strut 16, by the line 42. It should be noted that the lines 41 and 42, intersect each other, and intersect the axis of the axle 35, at the point 43. See Figures 1 and 4. The line of action of the rubber cord also passes through point 43. While the axle 35, is of course movable, a considerable part of shock of landing may be considered as concentrated along the axis of the axle 35, especially in case of side loads, and from there transmitted directly up the axes 41 and 42, of the two struts. This minimizes bending moments due to offset forces.

The general operation of the parts so far described is obvious. As the landing wheel hits the ground the shock is transmitted to the axle 35, from there to the bearing block 34 and to the slidable frame which starts to slide upward in the slot 13, the forces dissipating themselves in the elastic cable 40.

The several strut sockets may be provided with lugs 44 for attachment of suitable bracing wires, not shown.

Referring to Figure 3, a wheel 45, of conventional type is shown. A spring 46, may be positioned around the axle to space the hub of the wheel 45, from the slidable frame 27. As shown in Figure 3, it will be seen that the landing gear is rather long and narrow, a feature which of course lessens head resistance. To further lessen head resistance a two-part stream line cover is used, the lower part being indicated at 47, and the upper part at 48, the two parts joining along the line 49. The lower part 47, is mounted on the lugs 6 and 7, carried by the main frame 1, and the upper part 48, is mounted on and carried by the lugs 6′ and 7′ of the movable frame 27. When the airplane lands the shock of landing causes the movable frame 27 to move upwardly thereby carrying with it the upper cover 48. The cover 48 resumes its normal position as soon as the shock is taken up.

In Figure 5, is shown a detached view on a smaller scale, of the stream line casing of Figure 3, looking from a point between the wheels outwardly. The upper part 48 carries three semi-circular openings 50, 51 and 52, which co-operate with three similar openings 50′, 51′ and 52′, in the lower part 47. The central opening is for passage of the axle and the side openings are for the passage of the spacer rods 23 and 24. The central opening is through both sides of the casing, while the side openings are only through one side.

Removal of eight bolts, the four bolts 19, 20, 21 and 22, on each of the two landing gear units, will evidently facilitate quick assembly and disassembly from the struts.

Furthermore, by removing the wheels, the axle is completely removable without disturbing the strut attachments in any manner.

While I have illustrated my invention in considerable detail it should be understood that it is not limited to the exact details shown, but may be carried out in other ways, as defined in the annexed claims.

I claim as my invention:

1. In a landing gear, a main frame carrying fore and aft extensions, an auxiliary frame carrying corresponding fore and aft extensions, said auxiliary frame being slidably mounted in said main frame, and a resilient cable engaging over the lower edges of the first-mentioned fore and aft extentions and over the upper edges of the second-mentioned fore and aft extensions.

2. In a landing gear, a main frame carrying fore and aft extensions provided with corrugations, an auxiliary frame carrying similar respective fore and aft extensions provided with corrugations, arranged vertically with respect to the first-mentioned fore and aft extensions, resilient means connecting said fore sections and said aft sections, respectively, and seated in said corrugations, and an axle mounted in said slidable frame.

3. The combination in a landing gear, a main frame carrying fore and aft extensions, an auxiliary frame carrying corresponding fore and aft extensions, said auxiliary frame being slidably mounted in said main frame, and a resilient cable engaging over the lower edges of the first-mentioned fore and aft extensions and over the upper edges of the second-mentioned fore and aft extensions with a stream line cover enclosing said main and auxiliary frames.

4. The combination in a landing gear, a main frame carrying fore and aft extensions, an auxiliary frame carrying corresponding fore and aft extensions, said auxiliary frame being slidably mounted in said main frame, and a resilient cable engaging over the lower edges of the first mentioned fore and aft extensions and over the upper edges of the second-mentioned fore and aft extensions, with a two-part stream line cover, one part of said cover being carried by said main frame and the other part by said auxiliary frame.

5. In a landing gear, a main frame carrying fore and aft extensions, an auxiliary frame carrying fore and aft extensions, said auxiliary frame being slidably mounted in said main frame, an axle mounted in said slidable frame, and a single stretch of cable-like resilient means connecting said fore sections, and continued aft to connect said aft sections, in such a way that the tension in the two sections can become equalized.

6. The combination in a landing gear, a main frame carrying fore and aft extensions, an auxiliary frame carrying corresponding fore and aft extensions, said auxiliary frame being slidably mounted in said main frame, and a resilient cable engaging over the lower edges of the first mentioned fore and aft extensions and over the upper edges of the second-mentioned fore and aft extensions with struts rigidly mounted on said main frame so that the prolongation of the axis of one of said struts intersects the axis of said axle.

7. The combination in a landing gear, a main frame carrying fore and aft extensions, an auxiliary frame carrying corresponding fore and aft extensions, said auxiliary frame being slidably mounted in said main frame, and a resilient cable engaging over the lower edges of the first mentioned fore and aft extensions and over the upper edges of the second-mentioned fore and aft extensions with struts rigidly mounted on said main frame so that the prolongation of the axes of two of said struts intersect the axis of said axle.

8. In a landing gear, a main frame provided with a substantially vertical guide slot, fore and aft extensions carried by said frame, an auxiliary frame slidable in said guide slot, fore and aft extensions carried by said auxiliary frame, a resilient cable engaging over the lower edges of the fore and aft extensions carried by said frame, and further engaging over the upper edges of the fore and aft extensions carried by said auxiliary frame, and an axle carried by said auxiliary frame.

In testimony whereof I have affixed my signature.

JEAN A. ROCHÉ.